(12) United States Patent
Mehta

(10) Patent No.: US 8,279,564 B2
(45) Date of Patent: Oct. 2, 2012

(54) POWER LIMITING METHOD AND APPARATUS

(75) Inventor: Vinay Mehta, Germantown, TN (US)

(73) Assignee: Hunter Fan Company, Memphis, TN (US)

( * ) Notice: Subject to any disclaimer, the term of this patent is extended or adjusted under 35 U.S.C. 154(b) by 294 days.

(21) Appl. No.: 12/797,247

(22) Filed: Jun. 9, 2010

(65) Prior Publication Data

US 2011/0095707 A1    Apr. 28, 2011

Related U.S. Application Data

(60) Provisional application No. 61/255,217, filed on Oct. 27, 2009.

(51) Int. Cl.
*H01H 7/00* (2006.01)
(52) U.S. Cl. ............................................ 361/8; 361/12
(58) Field of Classification Search ................ 361/8–12, 361/103
See application file for complete search history.

(56) References Cited

U.S. PATENT DOCUMENTS

| | | | |
|---|---|---|---|
| 4,675,777 A | 6/1987 | Watrous | |
| 5,631,794 A * | 5/1997 | Yang | 361/60 |
| 5,762,699 A | 6/1998 | McGovern | |
| 5,834,908 A | 11/1998 | Boland et al. | |
| 5,909,090 A | 6/1999 | Nakamura et al. | |
| 5,995,350 A * | 11/1999 | Kopelman | 361/103 |
| 6,339,296 B1 | 1/2002 | Goral | |
| 6,819,060 B2 | 11/2004 | Readio et al. | |
| 6,967,446 B2 | 11/2005 | Hamaguchi et al. | |
| 6,998,791 B2 | 2/2006 | Kobayashi et al. | |
| 7,242,153 B2 | 7/2007 | Yu et al. | |
| 7,595,595 B2 | 9/2009 | Mehta | |
| 7,605,549 B2 | 10/2009 | Mehta et al. | |
| 2004/0100208 A1 | 5/2004 | Readio et al. | |
| 2004/0178748 A1 | 9/2004 | Hamaguchi et al. | |

OTHER PUBLICATIONS

Data Sheet from web address http://www.limitor.de/limitor/opencms/html/en/01_Division/Produktkatalog_CMS/Produktkatalog/Strom-_und_Temperaturbegrenzer/index.html; manufactured: May 5, 2009; Limitor Gmbh, Dieselstrasse 22, D-73660 Urback.

* cited by examiner

*Primary Examiner* — Danny Nguyen
(74) *Attorney, Agent, or Firm* — Baker Donelson; Dorian B. Kennedy

(57) ABSTRACT

Alternating electric current flow through a lamp fixture (L) of a maximum power rating is reduced without being terminated should a lamp be used in the fixture of a power rating that exceeds the fixture's maximum power rating. This is done using a thermally responsive switch (B) connected in series with a resistor (S) of relatively low resistance and in parallel with a resistor (P) of relatively high resistance, the switch and resistors being thermally connected, and by simultaneously passing alternating current to the fixture through an auxiliary line which has a diode (D1) that substantially halves current flow through the auxiliary line.

12 Claims, 1 Drawing Sheet

POWER LIMITING METHOD AND APPARATUS

REFERENCE TO RELATED APPLICATION

Applicant claims the benefit of U.S. Provisional Patent Application Ser. No. 61/255,217 filed Oct. 27, 2009.

TECHNICAL FIELD

This invention relates to power limiting methods and apparatuses, and particularly to methods and apparatuses for limiting power consumed by light fixtures.

BACKGROUND OF THE INVENTION

Light fixtures have been in use essentially ever since the introduction of electricity as a source of power in buildings and other environments. Modern light fixtures typically include at least one light source (such as an incandescent or fluorescent lamp) and a housing that supports and/or encloses the light source and connects it to an electrical power source (e.g. through a light socket and wiring.) They may be attached to ceilings, walls, or other parts of building structures, and may also be combined with other electrically powered components. For example, the combination of a light fixture and a fan fixture (e.g. a ceiling fan) is common used to provide fan/light combination fixtures.

Typically, light fixtures have some limitations (e.g. due to their structure or design) on the amount of current and/or temperature they can sustain under normal, safe, and/or otherwise desirable operating conditions. For example, many light fixtures are designed to safely sustain the current and temperature that typically results during the operation of one or more 60 watt bulbs connected to a 120 volt power source. Such safe operating limits (also described as ratings) are typically labeled on the light fixture to inform the user.

However, a light source which operation may cause a higher than rated current and/or temperature to occur in a light fixture (e.g. a 75 watt bulb substituted for a 60 watt rated bulb) can usually be installed, whether intentionally (e.g. to obtain more light) or accidentally as an oversight. Such operation of a light fixture with a larger light source than it is rated to handle may result in abnormal, unsafe, or otherwise undesirable conditions, which can cause a loss of operation and significant damage to the light fixture and the surrounding environment, e.g. due to excessive heat, smoke, and/or fire.

Heretofore many devices have been used to limit current flow to loads including light fixtures and ballasts. For example, thermisters have been used as sensors to trigger an electronic cutoff switch should current flow through it exceed a preselected level. Positive temperature coefficient switches or PTCs have also been so used. Triacs and relays have also been employed. These devices and circuits however usually require their own power source and consume power. This may be avoided with a PTC switch but only at the expense of a generation of significant heat. These circuits are also relatively costly for the passive role they normally play.

Circuit interrupters like fuses and circuit breakers are of course used in building circuits that service light fixtures. The fixtures themselves may also employ such together with a reset button. Operation of these however completely extinguishes the light which can create a hazardous situation. When the fixture is elevated, as in the case of a ceiling light or ceiling fan with lights, manual operation of the reset button will often require access to a stepladder.

It thus is seen that a need exists for an apparatus and method of controlling the power consumption of a light fixture to avoid damage or complete loss of operation without extinguishing it when a higher than rated light source is used deliberately or by oversight in the light fixture. It is to the provision of such that the present invention is primarily directed.

SUMMARY OF THE INVENTION

In a preferred form of the invention power limiting apparatus comprises a thermally insulated housing having an input conductor that extends through the housing for connection to an AC power source and an output conductor that extends through the housing for connection to an electrical load such as a lamp of a preselected maximum power rating. A thermally responsive switch is mounted within the housing and connected between the input and output conductors through a series resistor of relatively low resistance. A parallel resistor of relatively high resistance is mounted within the housing in parallel with the switch. A diode is connected to the input conductor and to the output conductor through an auxiliary line.

In operation, should the load exceed its maximum power rating the heat generated by high current flow through the series resistor causes the temperature within the housing to rise to a level to cause the temperature responsive switch to open and thereby place the parallel resistor of relatively high resistance in series with the series resistor thereby reducing without terminating current flow through the load. The inclusion of the auxiliary line may be dispensed with upon occasion with the selected values of the resistors alone used to insure that excessive power is not consumed by the fixture while sufficient power is consumed to insure that the fixture does radiate light.

In another preferred form of the invention a method is provided for preventing a potentially hazardous condition from arising created by a lamp of a power rating that exceeds a selected safe rating for a light fixture being used in the fixture without the luminescence of the fixture necessarily falling substantially below that producible by a lamp of or below the selected safe power rating. In accordance with the method AC electric power is conducted to the light fixture through a current limiter having a thermally responsive switch connect in series with a resistor of a relatively low resistance and in parallel with a resistor of a relatively high resistance, the switch and resistors being thermally connected. Simultaneously AC electric power it conducted to the light fixture lamp through an auxiliary current limiter which reduces without arresting current flow to the lamp upon activation of the thermally responsive switch.

DETAILED DESCRIPTION

Figure 1:
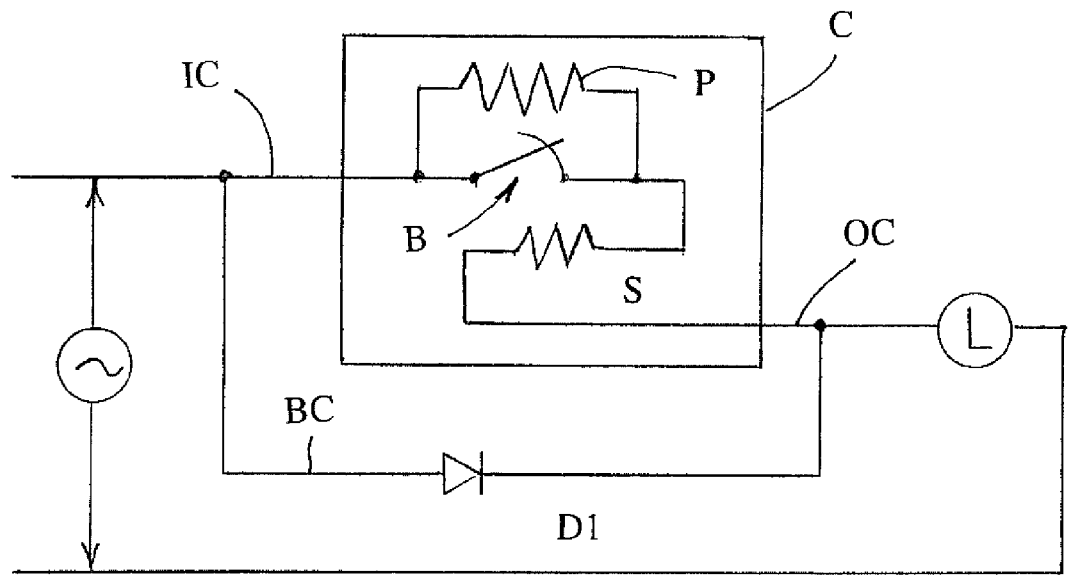
FIG. 1 is a schematic diagram of a power limiting apparatus that embodies principles of the invention in a preferred form and which may be used in practicing a preferred form of the inventive method.

With reference next to the drawing there is shown in FIG. 1 a load L, which may be one or more incandescent lamps of a light fixture that may be connected to an AC power source through the power limiting apparatus of the present invention. The power limiting apparatus includes a thermally insulated case C through which an input lead or conductor IC and an output lead or conductor OC extend. The input conductor IC is connected to the output conductor OC within case C through a bimetallic, thermally responsive switch B and a series resistor S. A parallel resistor P is connected across, i.e. in parallel with, the switch. The parallel switch has a resistance value that far exceeds that of the series resistor. With the switch and resistors all being within the case C, they are thermally connected. A bypass conductor BC is connected to the input conductor IC and to the output conductor OC preferable outside of the case C, as shown, through a diode D1 to provide an auxiliary current limiter.

In normal use AC current flows through switch B and series resistor S on a full-wave cycle basis. Current also flows through diode D1 on a half-wave cycle basis. However, should the load L be switched out for another load of an excessive power rating, i.e. of excessive wattage, that results in the current flow through series resistor S increasing substantially which generates substantially more heat. When the temperature of the temperature responsive switch B reaches its trip temperature it opens. The opening of the switch B places the parallel resistor P on line, it before having been shorted out by the switch in its closed position.

As resistor P is of a relatively high value the current flow through the load drops substantially. Nevertheless current still flows through it as it has all along flowed through diode D1 in half-wave form. The tripping open of switch B thus cuts current flow through the load about in half. Nevertheless the heat still generated inside the case C prevents the switch B from reclosing and cycling back and forth.

Again the load L may be an incandescent bulb as one with a tungsten filament or a set of bulbs in a light fixture component of a ceiling fan fixture. The lamp or combined lamps may have a rating of 100 watts. When a bulb or bulbs of a combined power rating of 100 watts or less is used the fixture emits light as designed in a safe manner. Should, however, a bulb or bulbs be used of a significantly higher wattage, say 200 watts, a hazardous condition may arise. In this case the heat emitted by the series resistor S will increase thereby raising the temperature within case C and the temperature of the temperature responsive switch B to its trigger temperature. In response the switch B opens thereby placing resistor P on line in series with resistor S, the switch P having previously been shorted by the closed switch B. This in turn reduces the current flow through the load L. Rather that the load generating 200 watts it may actually be returned to the 100 watt level for which it was designed. In any event light from the bulb or bulbs will not be extinguished as current will continue to flow through it, albeit at a reduced level. In this manner the hazardous condition at least potentially posed by use of an overrated bulb or bulbs will be avoided without simultaneously creating a potentially hazardous condition by a sudden extinguishing of all light. While the use of the bypass conductor and diode are preferred, such is not essential provided that resistors of appropriate values of the selected lamp fixture rating are employed.

Figure 2:
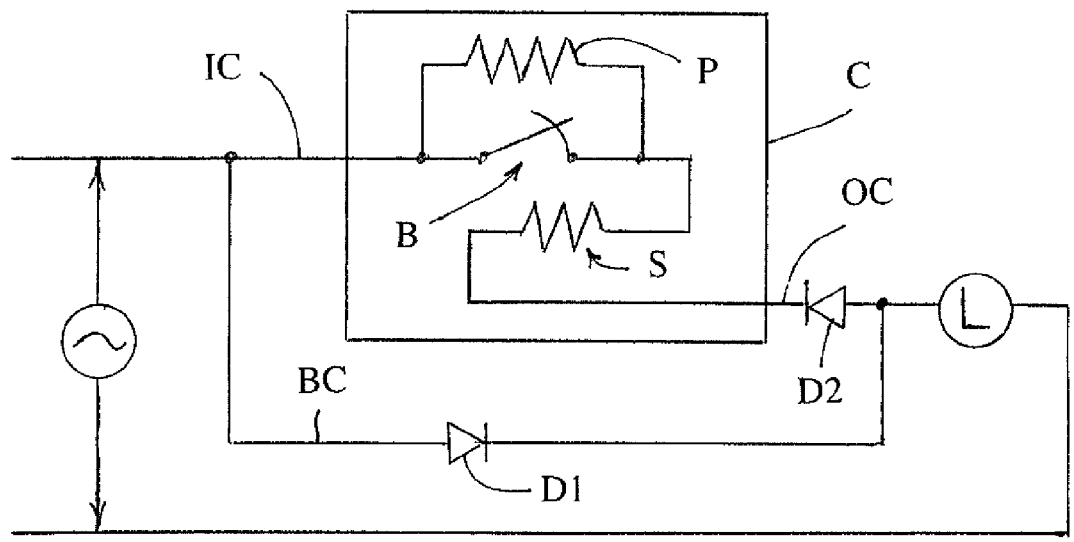
FIG. 2 is a schematic diagram of a power limiting apparatus that embodies principles of the invention in another preferred form and which also may be used in practicing another preferred form of the inventive method.

Another embodiment of the invention is shown in FIG. 2. The apparatus here is the same as that shown in FIG. 1 with the addition of another diode D2 connected to the output lead or conductor OC. This embodiment is preferred when the load draws higher current than the rating of the power limiting apparatus of the case C and its internal circuit. For example, where the full load rating of it is 4 amps, the bimetal switch is set to open at 3 amps but the lamp load is 5 amps. In this situation it is obvious that the power limiter cannot be used. The inclusion of the diode D2 however permits it.

Here diode D2 is connected to the output lead in reverse polarity to that of diode D1. Alternatively it may be connected to the input lead. Current flow through the circuitry within case C is halved thereby permitting its use. Thus for a load rating of 5 amps, 2.5 amps will normally flow through the case C and its internal circuitry and 2.5 amps through diode D1. Should an excessive lamp load of 7 amps be substituted, 3.5 amps will flow through the case C and 3.5 amps through the diode D1. Switch B will open at 3 amps and flow through the lamp will mostly be only through diode D1, albeit a small flow will continue to flow through case C sufficient to maintain the switch B open.

Example One

The lamp load rating is 140 watts and a 140 watt lamp is used.
Power Source: 120 VAC
Series resistor S: 0.4 ohms
Parallel resistor P: 25K ohms
Switch B trigger temperature: 120 degrees C.
Load: 140 watts
Here the current flow through series resistor S and the load (lamp) is 140/120 or 1.167 amps. The voltage drop across the resistor S is 1.167×0.4=0.466 volts. The power loss in the series resistor S in producing heat in case C is 0.54 watts. This is insufficient to trigger the switch.

Example Two

The lamp load is rated for 140 watts but a 200 watt bulb is used.
Power source: 120 VAC
Series resistor S: 0.4 ohms
Parallel resistor P: 25K ohms
Switch B trigger temperature: 120 degrees C.
Load: 200 watts
Here the current flow through the series resistor S is 200/120 or 1.67 amps. The voltage drop across the series resistor S is 1.67×0.4 or 0.668 volts. The power loss in the series resistor S is 1.11 watts in producing heat within the case C. This, plus the increase in ambient temperature around the bimetallic switch B produced by the added heat produced by the overrated lamp, is sufficient to raise the temperature of the switch above its trigger temperature of 120 degrees C. Therefore it opens which places the parallel resistor P on line with the lamp load L. Current flow is reduced to 25K/120 or 0.0048 amps which is sufficient for the lamp to continue to produce light. The power loss in the 25K ohm parallel resistor P with the switch open is 0.57 watts. The heat produced by it is sufficient to hold the switch open until it is reset by turning the light off.

The case C may be of a single part bag housing closed at its end by resin to render the switch B mold-proof for use in adverse environments such as high humidity and filth. Unsealed versions or plate bar versions may also be used. For ceiling fans an unsealed, Y5 model made by Limitor GmbH of Germany has proven to operate reliably. In that environment it need not be sealed.

Power on and off to the lamp (load L) may be controlled by a conventional wall switch either separately or with the switching of the fan on or off where the lamp is used with a fan. Alternatively a three-position switch may be used for the lamp wherein one position is power off, a second is for operation of the lamp through just the power limiter circuitry provided by the case C and its internal circuitry, and the third position adds the auxiliary line with diode D1.

It thus is seen that an apparatus and method is now provided for limiting the power consumed by a load such as a lamp when an overrated lamp is used deliberately or by accident. An important feature is that such an overrated lamp may still be emit light thereby avoiding a potentially hazardous situation from suddenly arising from unanticipated darkness while simultaneously another potentially hazardous situation of excessive heating is avoided. This is accomplished with a minimum of power limiting circuitry and expense which is another important feature in view of the fact that power limiters are inherently unessential to lamp operation.

It should be understood that the just described embodiments merely serve to illustrate principles of the invention in preferred forms thereof. Additions and deletions and other modifications may of course be made thereto without departure from the spirit and scope of the invention as set forth in the following claims.

The invention claimed is:

1. A power limiting apparatus comprising a thermally insulated housing having an input conductor adapted to be connected with an AC power source that extends through said housing and an output connector extending through said housing adapted to be connect to a lamp; a thermally responsive switch mounted within said housing switchably connecting said input connector with said output connector through a series resistor of relatively low resistance; a parallel resistor of relatively high resistance mounted within said housing in parallel with said switch; and a bypass conductor connected to said input conductor and to said output conductor through a diode, whereby should the lamp exceed its maximum power rating in use the temperature within the housing may rise to a level sufficient to cause the temperature responsive switch to open and thereby place the parallel resistor in series with the series resistor to reduce without terminating current flow through the lamp.

2. The power limiting apparatus of claim 1 wherein said thermally responsive switch is bimetallic.

3. The power limiting apparatus of claim 1 wherein said diode is located outside of said housing.

4. The power limiting apparatus of claim 1 further comprising a second diode connected to said output conductor or said input conductor with its polarity reversed with respect to the polarity of said diode.

5. Power limiting apparatus for limiting the power of a lamp fixture to generally that of the power rating for the fixture to avoid the creation of a hazardous situation occurring through use of a lamp of a power rating in excess of the fixture power rating, and with the apparatus comprising a thermally insulated housing having an input conductor adapted to be connected with an AC power source that extends through said housing and an output connector extending through said housing adapted to be connected to a lamp; a thermally responsive switch mounted within said housing switchably connecting said input connector with said output conductor through a series resistor of relatively low resistance; and a parallel resistor of relatively high resistance mounted within said housing in parallel with said switch whereby should the lamp exceed its maximum power rating in use the temperature with the housing may rise to a level sufficient to cause the temperature responsive switch to open and thereby place the parallel resistor in series with the series resistor to reduce without terminating current flow through the lamp thus avoiding the creation of a hazardous situation while yet insuring the continued emission of light by use of the overrated lamp.

6. A method of preventing a hazardous condition from arising created by use of a lamp of a power rating that exceeds a preselected safe rating for a light fixture being used without the luminescence of the fixture falling substantially below that producible by a lamp of the selected safe rating or below, and wherein the method comprises conducting AC electric power to the light fixture through a current limiter having a thermally responsive switch connected in series with a resistor of a relatively low resistance and in parallel with a resistor of a relatively high value while simultaneously conducting AC electric power to the light fixture lamp through an auxiliary current limiter.

7. The method of claim 6 wherein electric power is conducted through the current limiter with the thermally responsive switch being thermally connected with the resistor of relatively low resistance.

8. The method of claim 7 wherein AC electric power is conducted through the current limiter with the thermally responsive switch being thermally connected with the resistor of relatively high resistance.

9. The method of claim 6 wherein AC electric power is simultaneously conducted to the light fixture lamp through a diode that serves as the auxiliary current limiter.

10. The method of claim 9 wherein AC power is conducted to the light fixture lamp through the current limiter and another diode that has its polarity reversed to that of the auxiliary current limiter diode.

11. A method of limiting current flow through a lamp in a lamp fixture having a maximum AC power rating and with the method comprising passing current to the lamp through a thermally responsive switch and a resistor of relatively low resistance, the thermally responsive switch having a resistor of relatively high resistance electrically connected across and thermally connected with it, and simultaneously conducting current through an auxiliary conductor and diode mounted in parallel with the thermally responsive switch whereby should a lamp be used in the fixture of a power rating that exceeds the maximum fixture rating the thermally responsive switch trips and places the resistor of relatively high resistance on line in series with the lamp thereby reducing current flow through the lamp.

12. A method of limiting current flow through a lamp in a lamp fixture having a maximum AC power rating to avoid the creation of a hazardous situation arising from the use of a lamp of a power rating in excess of that of the fixture while insuring the continued emission of significant light by that lamp, and wherein the method comprising passing current to the lamp through a thermally responsive switch and a resistor of relatively low resistance, the thermally responsive switch having a resistor of relatively high resistance electrically connected across and thermally connected with it, the parallel resistance coming in series connection with the series resistor upon an opening of the thermally responsive switch such that the lamp of excessive power continues to consume power but not substantially above the fixture rating.

\* \* \* \* \*